United States Patent
Lipfert et al.

(10) Patent No.: US 10,951,444 B2
(45) Date of Patent: Mar. 16, 2021

(54) IN HOUSE RECEPTION OF TRANSMISSION SIGNALS COMPLIANT TO A STANDARD SPECIFICATION FOR MOBILE PHONE

(71) Applicant: INSTITUT FUR RUNDFUNKTECHNIK GMBH, Munich (DE)

(72) Inventors: Hermann Lipfert, Oberhaching (DE); Clemens Kunert, Unterfohring (DE); Swen Petersen, Munich (DE); Benjamin Lembke, Munich (DE)

(73) Assignee: Institut Fur Rundfunktechnik GMBH, Munich (DE)

( * ) Notice: Subject to any disclaimer, the term of this patent is extended or adjusted under 35 U.S.C. 154(b) by 27 days.

(21) Appl. No.: 16/315,563

(22) PCT Filed: Jul. 7, 2017

(86) PCT No.: PCT/IB2017/054108
§ 371 (c)(1),
(2) Date: Jan. 4, 2019

(87) PCT Pub. No.: WO2018/007993
PCT Pub. Date: Jan. 11, 2018

(65) Prior Publication Data
US 2019/0182084 A1  Jun. 13, 2019

(30) Foreign Application Priority Data

Jul. 7, 2016  (IT) .................. 102016000070964

(51) Int. Cl.
*H04L 27/14* (2006.01)
*H04B 1/00* (2006.01)
(Continued)

(52) U.S. Cl.
CPC ............. *H04L 27/14* (2013.01); *H01Q 1/007* (2013.01); *H01Q 1/2291* (2013.01);
(Continued)

(58) Field of Classification Search
CPC ......... H04L 27/14; H04L 27/12; H01Q 1/007; H01Q 1/2291; H04B 1/006; H04B 1/0064
See application file for complete search history.

(56) References Cited

U.S. PATENT DOCUMENTS

2004/0105434 A1  6/2004  Baw
2009/0262715 A1  10/2009  Juang
(Continued)

OTHER PUBLICATIONS

International Search Report and Written Opinion dated Oct. 17, 2017, issued in PCT Application No. PCT/IB2017/054108 filed Jul. 7, 2017.

*Primary Examiner* — Curtis B Odom
(74) *Attorney, Agent, or Firm* — Workman Nydegger

(57) ABSTRACT

A receiver arrangement for receiving a wirelessly transmitted HF transmission signal includes a first conversion unit for converting the HF transmission signal into a baseband information signal. Furthermore, an extraction unit is provided for extracting IQ data from the baseband information signal. A second conversion unit converts the IQ data into a further transmission signal. Additionally, a transmitter is provided for wirelessly transmitting the further transmission signal to a consumer electronics receiver unit. For normal reception of the HF transmission signal, the consumer electronics receiver unit is provided with a first antenna arrangement for receiving the HF transmission signal, and further includes a first signal processing stage for converting the HF transmission signal into IQ data, which are comprised in the HF transmission signal, and a second signal conversion stage for processing the IQ data into an output information signal of the consumer electronics receiver unit.

13 Claims, 2 Drawing Sheets

(51) Int. Cl.
*H01Q 1/00* (2006.01)
*H01Q 1/22* (2006.01)
*H04L 27/12* (2006.01)
*H04M 1/725* (2021.01)

(52) U.S. Cl.
CPC ........... H04B 1/006 (2013.01); H04B 1/0064 (2013.01); H04L 27/12 (2013.01); *H04M 1/7253* (2013.01); *H04M 2250/06* (2013.01)

(56) References Cited

U.S. PATENT DOCUMENTS

| | | | |
|---|---|---|---|
| 2014/0094214 A1* | 4/2014 | Meyer | H04W 52/242 455/522 |
| 2014/0241296 A1* | 8/2014 | Shattil | H04B 7/026 370/329 |

* cited by examiner

IN HOUSE RECEPTION OF TRANSMISSION SIGNALS COMPLIANT TO A STANDARD SPECIFICATION FOR MOBILE PHONE

BACKGROUND OF THE INVENTION

1. The Field of the Invention

The invention relates to a receiver arrangement according to the preamble of claim 1. The invention also relates to a consumer electronics receiver unit.

2. The Relevant Technology

A consumer electronics receiver unit is known, for example, as a mobile telecommunications receiver unit (smartphone). In some circumstances, the quality of reception of such a receiver unit is not satisfactory within indoor environments.

SUMMARY OF THE INVENTION

The invention aims at improving, in particular, the quality of reception of mobile telecommunications receiver units within indoor environments.

To this end, the receiver arrangement has features set out in the claims. Likewise, the consumer electronics receiver unit has features set out in the claims.

The invention is based on the following inventive ideas.

Due to the fact that quality of reception decreases inside a building, the invention provides for converting the HF transmission signal, e.g., compliant with 2G, 3G, 4G or later versions, sent in wireless mode and received by a receiver arrangement, the reception antenna of which is preferably located outside the building, into a further transmission signal that extracts the IQ data from the original HF transmission signal and forwards said IQ data via the transmission arrangement already available inside the building, e.g., a WLAN, so that such data can be received by the consumer electronics receiver unit located inside the building.

According to the invention, it is appropriate that the consumer electronics receiver unit can receive and further process the IQ data transmitted in the form of a further transmission signal.

Some advantageous improvements of the receiver arrangement and of the consumer electronic receiver unit are defined in the claims.

It is a particular object of the present invention to provide a receiver arrangement, a consumer electronics receiver unit and an actuation software program or app as set out in detail in the claims, which are an integral part of the present description.

BRIEF DESCRIPTION OF THE DRAWINGS

The invention will now be described more in detail with reference to the annexed drawings, wherein.

DETAILED DESCRIPTION OF THE DRAWINGS

Figure 1:
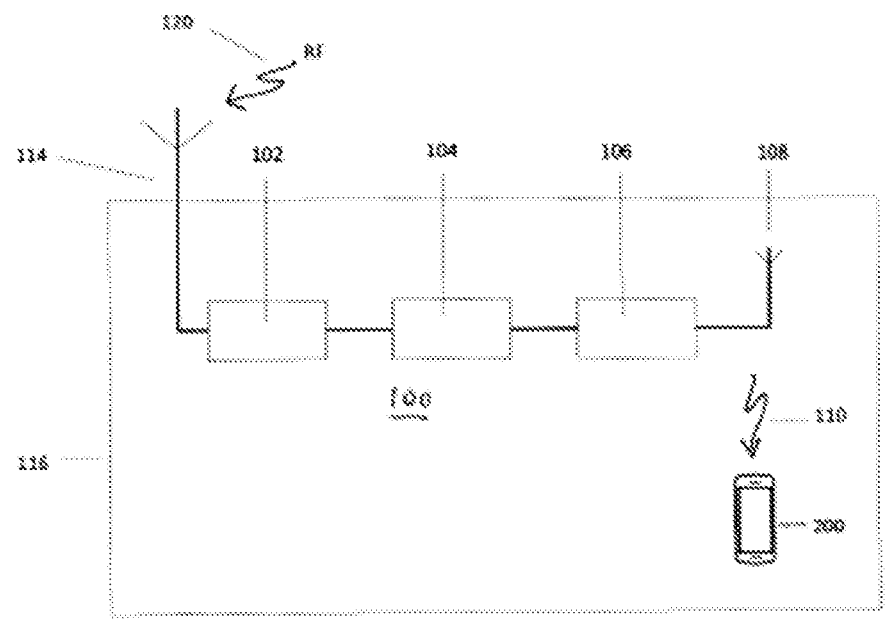
FIG. 1 shows one embodiment of a receiver arrangement according to the invention.

FIG. 1 shows a building 116. Outside this building, e.g., on the roof of the building 116, a receiver antenna 114 is arranged for receiving a wirelessly transmitted HF transmission signal 120. Said antenna 114 is part of a receiver arrangement 100 and is coupled to an input of a first conversion unit 102. The first conversion unit 102 converts the HF transmission signal into a baseband information signal, which is forwarded to an output. This output is coupled to an input of an extraction unit 104. In this extraction unit 104, the IQ data are retrieved from the baseband information signal and forwarded to an output. This output is coupled to an input of a second conversion unit 106. In this second conversion unit 106, the IQ data are converted into a further transmission signal at a transmitter antenna 108 for wirelessly transmitting the further transmission signal to a receiver unit 200 located inside the building. For this purpose, the transmitter antenna 108 is located inside the building. The consumer electronics receiver unit 200 may be, for example, a mobile phone (smartphone). Because the receiver unit 200 is located inside the building, the quality of reception of the HF transmission signal 120 in the building may be insufficient. This is why the receiver arrangement 100 is provided, which receives the HF transmission signal 120 and converts it into the further transmission signal 110, which can then be received by the receiver unit 200 with sufficient quality of reception.

The HF transmission signal is, for example, a transmission signal compliant with a mobile telecommunications standard specification, such as 2G, 3G, 4G or a later version. The further transmission signal 110 is, for example, a transmission signal compliant with a WLAN standard specification, such as, for example, IEEE802.11. The IQ data can be entered, for example, directly into the MAC layer of the WLAN protocol.

The IQ data are obtained from the HF transmission signal 120 in the extraction unit 104 in accordance with the prior art, e.g., as described in detail in the handbook entitled "Digitale Fernsehund Hörfunktechnik in Theorie and Praxis" by W. Fischer, Springer Verlag. See, for example, pages 239 to 254.

The IQ data have the same contents as the HF transmission signal 120, i.e., information for a smartphone being called, such as, for example, the phone number and the actual conversation data contained in the IQ data.

The above applies not only to the IQ data stream transmitted by the receiver arrangement 100, via the WLAN transmission line, from the antenna 108 to the antenna 208 of the consumer electronics receiver unit 200, but also to the IQ data stream transmitted by the consumer electronics receiver unit 200 from the antenna 208, via a return channel on said WLAN transmission line, to the antenna 108. This IQ data stream includes, among other data, the conversation data of the conversation of the users of the receiver unit 200 that must be transmitted to the callers. The transmission of the data between the two devices 100 and 200 in both directions over the WLAN transmission line occurs by time-division multiplexing.

The processing of the (conversation) information signal transmitted in the opposite direction from the receiver unit 200 to the receiver arrangement 100 in the various stages is inverse to the above-described signal processing. In stage 206, among other things, the voice information is converted into IQ data, and in stage 210 such IQ data are converted into a WLAN transmission signal, which is transmitted to the receiver arrangement 100 over the WLAN return channel. In stage 106 of the receiver arrangement 100, the IQ data are retrieved from the received WLAN transmission signal, in stage 104 the IQ data are converted into a baseband information signal, and in stage 102 they are converted into an HF transmission signal, e.g., compliant with 2G, 3G, 4G or a later version, and emitted through the antenna 114.

Figure 2:
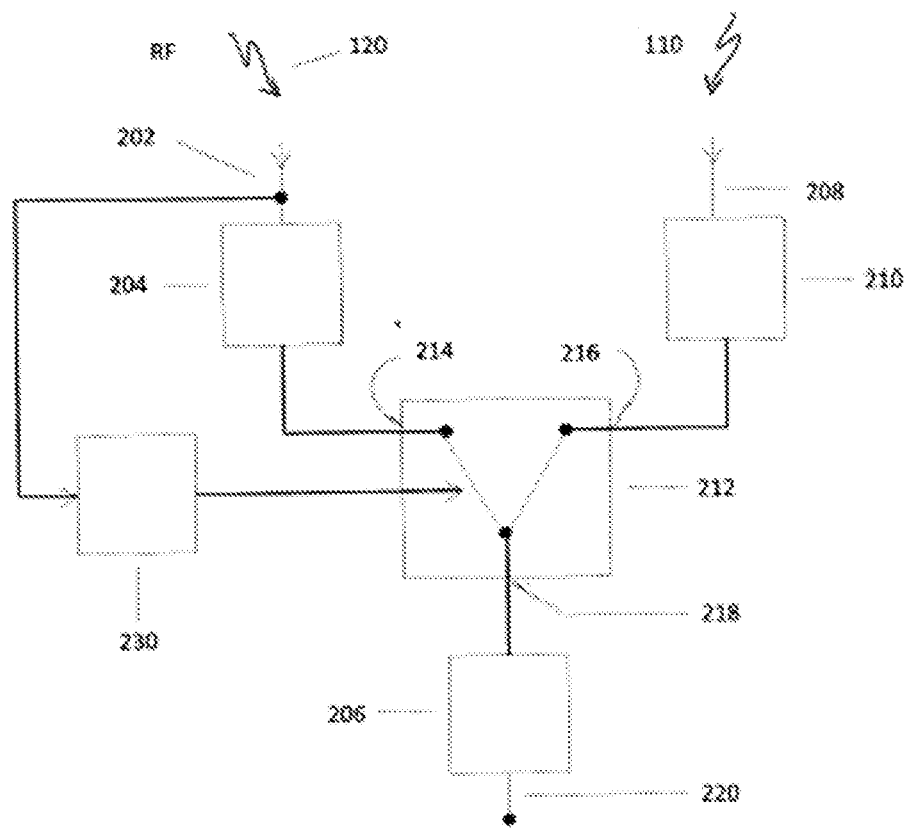
FIG. 2 shows one embodiment of a consumer electronics receiver unit according to the invention.

Of course, the consumer electronics receiver unit 200 should be so conceived as to be able to correctly receive and process the further transmission signal. FIG. 2 shows one possible embodiment of such a receiver unit 200 realized in the form of a consumer electronics apparatus, e.g., a smartphone.

The receiver unit 200 is provided with a first antenna arrangement 202 for receiving the HF transmission signal 120, and further comprises a first signal processing stage 204 for converting the HF transmission signal 120 into IQ data contained in the HF transmission signal 120. There is also a second signal processing stage 206 for transforming the IQ data into an output information signal of the receiver arrangement 200, available at the output 220. This is the normal implementation and operation of a smartphone.

According to the invention, in order to receive the further transmission signal 110, the consumer electronics receiver unit 200 is also provided with a second antenna arrangement 208. As previously described, the further transmission signal comprises the IQ data retrieved from the HF transmission signal 120. The receiver unit 200 further comprises a third signal processing stage 210 for extracting the IQ data from the further transmission signal. There is also a switching unit 212, which comprises a first input 214 coupled to an output of the first signal processing stage 204, a second input 216 coupled to an output of the third signal processing stage 210, and an output 218 coupled to an input of the second signal processing stage 206.

In more detail, the consumer electronics receiver unit of FIG. 2 is provided with a signal processing stage 210 in order to receive the transmission signal of the transmitter unit 116, which is a WLAN transmission signal having IP packets of information, the packets comprising the IQ Data extracted by the unit 104 and stored in such packets. In order to receive and process the transmission signal from the transmitter unit 116, the unit 210 is adapted to first derive IQ data from the transmission signal 110 and decode the IQ data thus obtained into a sequence of IP packets, the IP packets comprising the IQ data generated by the unit 104. Thereafter, the unit 210 is adapted to retrieve the IQ data stored in the IP packets from such IP packets and supply the IQ data thus obtained to the terminal 216 of the switching unit 212. The receiver unit 200 is also provided with a detector unit 230.

This detector unit 230 is adapted to detect if the HF transmission signal 120 has sufficient quality of reception. This can be detected, for example, by measuring the reception level of the signal received by the antenna 202. To this end, said reception level is compared with a given threshold. If the reception level if below said threshold, then the detector unit will generate a first control signal that will actuate the switching unit 212 in a manner such that the switching unit 212 will take a position wherein the input 216 is connected to the output 218. If the reception level exceeds said threshold, then the detector unit will generate a second control signal that will actuate the switching unit 212 in a manner such that the switching unit 212 will take a position wherein the input 214 is connected to the output 218.

It should be understood that the control of the switching unit 212 could be realized in a different way, e.g., by detecting the transmission signal 110 transmitted by the transmitter unit 116. This could be done, for example, by detecting the reception level of the transmission signal 110.

The principle of operation of the consumer electronics receiver unit 200 is as follows.

In normal operating conditions, the receiver unit 200 receives an HF transmission signal 120 which, if the quality of reception of the HF transmission signal is sufficiently high, is correctly received and decoded in the stages 204 and 206, resulting in an output signal at the output 220. The switching unit 212 is in a position wherein the input 214 is connected to the output 216. The consumer electronics receiver unit 200 can, at this point, receive and process the HF transmission signal 120.

If the quality of reception of the HF transmission signal 120 is so low that the HF transmission signal cannot be properly received and processed in the consumer electronics receiver unit 200, the detector unit will generate the first control signal to bring the switching unit 212 into a position wherein the input 216 is connected to the output 218.

The receiver unit 200 will now be able to receive and process the further transmission signal 110. This means that, when there is an incoming phone call, the consumer electronics receiver unit 200 will recognize its own phone number in the IQ data and will then set up a telephone connection over the WLAN line 110 in a manner known in the art, so that a telephone conversation can take place.

In this example of embodiment, the consumer electronics receiver unit 200 is provided with two different antenna arrangements 202 and 208. This is not however a mandatory requirement. In another exemplary embodiment, both antenna arrangements of the receiver unit 200 are implemented as a single antenna arrangement.

When the consumer electronics receiver unit 200 is a smartphone, the processing of the signal in the third signal processing stage and the switching function of the switching device 212 can be implemented as a separate software program or app in the receiver unit 200, so that the function of the invention can be actuated in the smartphone at a later time.

Another example of embodiment of the consumer electronics receiver unit 200 consists, for example, of a laptop additionally provided with the signal processing blocks 210 and 206 of FIG. 2. This embodiment will allow setting up telephone conversations with the laptop over the WLAN line 110.

For existing laptops to function in accordance with the invention, the laptop can be equipped with a software program or app installed therein, so that the functions of the elements 210 and 206 can be executed in the laptop.

It is also conceivable to use a software program or app that, once loaded in a processor unit, will actuate the function of the signal processing blocks 102, 104 and 106 of the receiver arrangement, as shown in FIG. 1.

Figure 3:
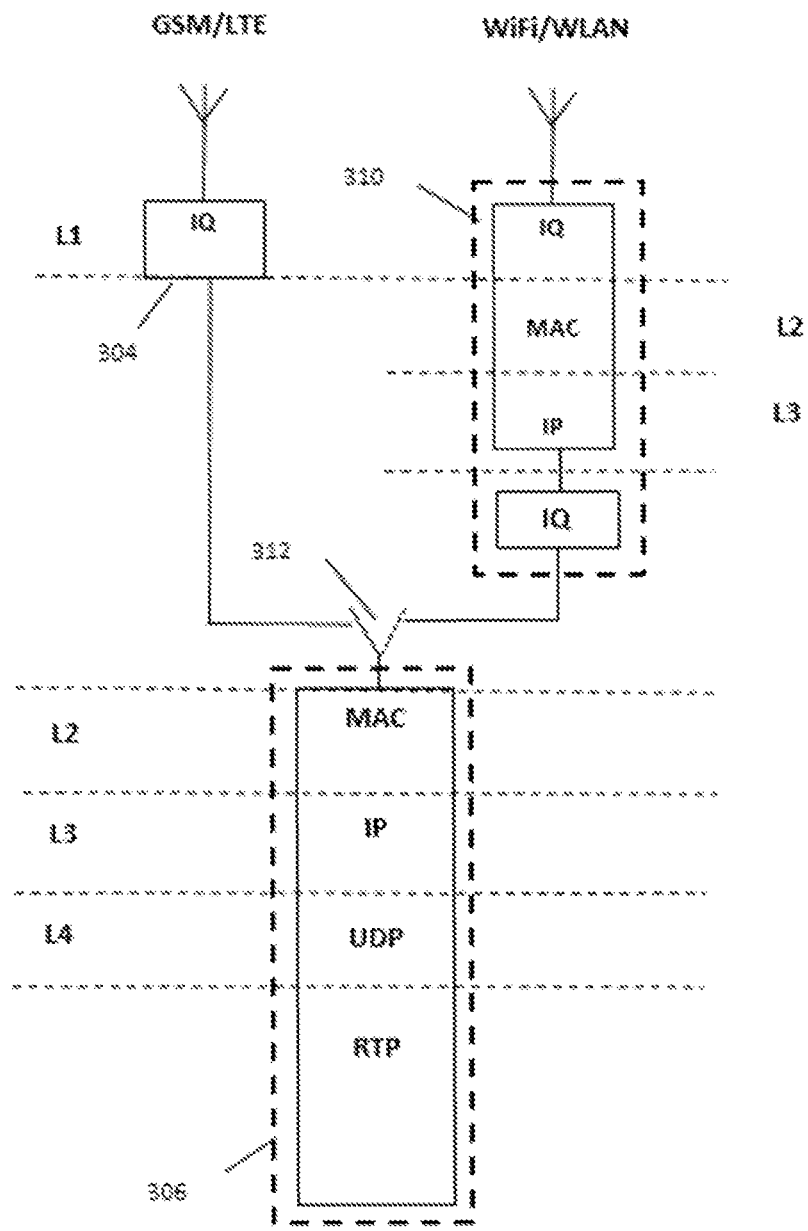
FIG. 3 illustrates more in detail the receiver unit of FIG. 2.

FIG. 3 shows a more detailed description of the receiver apparatus according to the invention of FIG. 2. The description is in the form of a layer model. In the normal mobile phone mode (GSM/LTE), the switch 312, which is the same switch as the switch 212 in FIG. 2, is in the position as shown. The signal processing unit 204 of FIG. 2 is shown in FIG. 3 as block 304 and carries out a signal extraction function so as to extract the IQ data from the transmission signal 120. This is actually Layer L1 in the receiver and demodulation chain of the mobile phone, when in GSM/LTE reception mode. The signal processing unit 206 of FIG. 2 is shown in FIG. 3 as block 306 and carries out the subsequent signal processing steps of the layers L2 and further. That is a MAC (Media Access Control) signal processing, and IP (Internet Protocol) signal processing, a UDP (Universal Datagram Protocol) signal processing and an RTP (Real-time Transport Protocol) signal processing.

When the receiver apparatus is in the receiver mode for receiving the WiFi/WLAN transmission signal 110, the switch 312 is in the other position, indicated by the dashed line. The signal processing block 210 of FIG. 2 is shown in FIG. 3 as block 310. First a Layer 1 processing is carried out in which IQ data are extracted from the transmission signal 110. These IQ data are not the IQ data that have been extracted by the apparatus 116 of FIG. 1. Actually the IQ data derived in the L1 layer of the block 310 is further subjected to a MAC signal processing step and an IP signal processing step. From the data derived in the IP signal processing step, the IQ data transmitted by the apparatus 116 of FIG. 1 can be extracted.

The IQ data so obtained are supplied, via the switch 312, to the signal processing block 306, and are thus subjected to the same signal processing steps as the IQ data derived in the signal block 304.

The elements and features illustrated in the various preferred embodiments can be combined together without however departing from the protection scope of the present invention.

In light of the above description, the man skilled in the art will be able to realize the object of the invention without introducing any further construction details.

The invention claimed is:

1. A telecommunications system comprising:
    a receiver arrangement for receiving a wirelessly transmitted HF transmission signal, the receiver arrangement comprising:
        a receiver antenna for receiving the HF transmission signal;
        a first conversion unit for converting the HF transmission signal into a baseband information signal;
        an extraction unit for extracting IQ data from the baseband information signal;
        a second conversion unit for converting the IQ data into a further transmission signal; and
        a transmitter for wirelessly transmitting the further transmission signal to a consumer electronics receiver unit, which is located within an area defined by a HF signal impeding structure,
    wherein:
        the receiver antenna is located outside of the area defined by the HF signal impeding structure while the transmitter is located inside of the area such that the HF signal impeding structure is positioned between the receiver antenna and the transmitter, and
        the HF signal impeding structure impedes the HF transmission signal such that a signal quality of the HF transmission signal is reduced within the area as compared to outside of the area; and
    said consumer electronics receiver unit, which comprises:
        a first antenna arrangement for receiving the HF transmission signal;
        a first signal processing stage for converting the HF transmission signal into IQ data contained in the HF transmission signal;
        a second signal processing stage for transforming the IQ data converted by the first signal processing stage into an output information signal of the consumer electronics receiver unit;
        a second antenna arrangement for receiving the further transmission signal transmitted by the receiver arrangement;
        a third signal processing stage for converting the further transmission signal received by the second antenna arrangement into IQ data; and
        a switching unit comprising:
            a first input coupled to an output of the first signal processing stage;
            a second input coupled to an output of the third signal processing stage; and
            an output coupled to an input of the second signal processing stage.

2. The telecommunications system according to claim 1, wherein the HF transmission signal is a transmission signal compliant with a mobile telecommunications standard specification.

3. The telecommunications system according to claim 1, wherein the further transmission signal is a transmission signal compliant with a WLAN standard specification.

4. The telecommunications system according to claim 1, wherein the HF signal impeding structure is a building, and wherein the receiver antenna is located outside the area, which is defined by the building.

5. The telecommunications system according to claim 4, wherein the transmitter includes an antenna that is located inside the area, which is defined by the building.

6. The telecommunications system according to claim 1, wherein the consumer electronics receiver unit is further provided with a detector unit for detecting a quality of reception of the HF transmission signal,
    wherein the detector unit is adapted to generate a first control signal when the quality of reception is below a given threshold, and
    wherein the switching unit is a controllable switching unit adapted to connect the second input to the respective output as a function of the first control signal.

7. The telecommunications system according to claim 6, wherein the detector unit is adapted to generate a second control signal when the quality of reception exceeds a given threshold, and
    wherein the controllable switching unit is adapted to connect the first input to the respective output as a function of the second control signal.

8. The telecommunications system according to claim 1, wherein the HF transmission signal is a transmission signal compliant with a mobile telecommunications standard specification.

9. The telecommunications system according to claim 1, wherein the first and second antenna arrangements are implemented as one common antenna arrangement.

10. The telecommunications system according to claim 1, wherein the further transmission signal is a transmission signal compliant with a WLAN standard specification.

11. The telecommunications system according to claim 1, wherein the receiver unit is one type of smartphone.

12. A telecommunications system comprising:
    a receiver arrangement for receiving a wirelessly transmitted HF transmission signal, the receiver arrangement comprising:
        a first conversion unit for converting the HF transmission signal into a baseband information signal;
        an extraction unit for extracting IQ data from the baseband information signal;
        a second conversion unit for converting the IQ data into a further transmission signal; and
        a transmitter for wirelessly transmitting the further transmission signal to a consumer electronics receiver unit; and the consumer electronics receiver unit, which receives the further transmission signal, the consumer electronics receiver unit comprising:
- a first antenna arrangement for receiving the HF transmission signal;
- a first signal processing stage for converting the HF transmission signal into IQ data contained in the HF transmission signal;
- a second signal processing stage for transforming the IQ data into an output information signal of the consumer electronics receiver unit;
- a second antenna arrangement for receiving the further transmission signal transmitted by the receiver arrangement;
- a third signal processing stage for converting the further transmission signal into the IQ data; and
- a switching unit comprising:
  - a first input coupled to an output of the first signal processing stage;
  - a second input coupled to an output of the third signal processing stage; and
  - an output coupled to an input of the second signal processing stage.

13. A consumer electronics receiver unit comprising:
- a first antenna arrangement structured to directly receive a HF transmission signal comprising first IQ data;
- a first set of one or more signal processing stages structured to transform the first IQ data, which is obtained from the HF transmission signal, into a first output information signal;
- a second antenna arrangement structured to receive a baseband transmission signal comprising second IQ data, the baseband transmission signal being a baseband converted version of the HF transmission signal such that the second IQ data is the same as the first IQ data;
- a second set of one or more signal processing stages structured to transform the second IQ data, which is obtained from the baseband transmission signal, into a second output information signal; and
- a switching unit that switches between using the first output information signal or the second output information signal, the switching unit using the first output information signal when a quality of reception of the HF transmission signal satisfies a threshold quality and using the second output information signal when the quality of reception does not satisfy the threshold quality.

* * * * *